(12) United States Patent
Gao et al.

(10) Patent No.: US 9,679,181 B1
(45) Date of Patent: Jun. 13, 2017

(54) SYSTEM AND METHOD FOR LABEL PHYSICAL LOCATION BASED STITCHING AND LABEL ITEM CORRELATION FOR IMAGING BARCODE SCANNERS

(71) Applicant: Datalogic ADC, Inc., Eugene, OR (US)

(72) Inventors: WenLiang Gao, Eugene, OR (US); Craig Cherry, Eugene, OR (US); Jonathan R. Brandt, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/960,220

(22) Filed: Dec. 4, 2015

(51) Int. Cl.
*G06K 19/00* (2006.01)
*G06K 7/14* (2006.01)
*G06K 7/10* (2006.01)

(52) U.S. Cl.
CPC ....... *G06K 7/1491* (2013.01); *G06K 7/10861* (2013.01)

(58) Field of Classification Search
USPC .................. 235/435, 439, 454, 462
See application file for complete search history.

(56) References Cited

U.S. PATENT DOCUMENTS

| | | |
|---|---|---|
| 5,444,231 A | 8/1995 | Shellhammer et al. |
| 5,495,097 A | 2/1996 | Katz et al. |
| 5,917,945 A | 6/1999 | Cymbalski |
| 5,979,768 A | 11/1999 | Koenck |
| 7,344,080 B2 | 3/2008 | Vinogradov et al. |
| 8,319,823 B2 | 11/2012 | Chen et al. |
| 8,322,621 B2 | 12/2012 | Olmstead |
| 8,441,695 B2 | 5/2013 | Zahnert et al. |
| 8,608,077 B2 | 12/2013 | Olmstead |
| 8,678,286 B2 | 3/2014 | Smith et al. |
| 8,678,287 B2 | 3/2014 | Olmstead |
| 9,092,654 B2 | 7/2015 | Wang |
| 2008/0245873 A1* | 10/2008 | Dwinell .................. G06T 7/60 235/462.41 |
| 2013/0020392 A1 | 1/2013 | Olmstead et al. |
| 2013/0126617 A1 | 5/2013 | Olmstead |
| 2013/0181051 A1 | 7/2013 | Olmstead et al. |
| 2014/0098220 A1 | 4/2014 | Nunnink et al. |

FOREIGN PATENT DOCUMENTS

CN 201410379374 11/2014

* cited by examiner

*Primary Examiner* — Matthew Mikels
(74) *Attorney, Agent, or Firm* — Dentons US LLP

(57) ABSTRACT

A system and method for reading a label may include imaging, by a plurality of cameras, a label applied to an item. A 3D position of each segment of the label imaged by any of the cameras may be determined. The segments in the same relative 3D location as the item and other segments may be associated. The label formed from the segments associated with the item may be read.

6 Claims, 9 Drawing Sheets

SYSTEM AND METHOD FOR LABEL PHYSICAL LOCATION BASED STITCHING AND LABEL ITEM CORRELATION FOR IMAGING BARCODE SCANNERS

BACKGROUND

In an imaging label scanner, such as a barcode scanner, one problem that exists is that full labels with barcodes or other indicia (e.g., QR codes) are not always seen by imagers due to label folding, distortion, specular reflection, camera orientation, etc. As such, label stitching, as understood in the art, may be utilized to improve the reading of labels. For accuracy and error reduction purposes, label stitching overlaps multiple characters since segments of labels can be captured from different labels on one or more products in a field-of-view of imaging cameras. For automated barcode scanners, such as Jade X7™ produced by Datalogic ADC, Inc, the stitching success rate is lower than commercially possible since items pass through a scanning portal only once, and no human intervention (e.g., rescanning) is possible to correct for a scanning misread or no read.

Another problem that exists with label scanners is that simplified item computer modeling, such as modeling items as cylinders and rectangular boxes, may be used for automated scanners. Item modeling may use a maximum height and width as a rectangular box height and width so that label strike calculations of one item can be blocked by a rectangular box from another item using simplified modeling. However, misalignment due to camera "see-through" may cause a barcode affixed to a second item positioned behind a first item being scanned that results in the label or segments of the labels being applied to the first item being scanned, thereby causing a label to assigned to a wrong item or an error in the label scanning process. Accordingly, there is a need to improve a label scanning and reading of automated label readers.

SUMMARY

Proper reading of labels on items scanned by an automated label reader using multiple imaging scanners or cameras may be performed by imaging a label (e.g., barcode, UPC code, or other indicia) on an item, associating the imaged full label to the item or associating 3D coordinates to imaged segments of the label, and stitching the imaged label segments together that are physically associated.

One embodiment of a method for reading a label may include imaging, by a plurality of cameras, a label applied to an item. A 3D position of each label or segment of the label imaged by any of the cameras may be determined. The label or segments in the same relative 3D location as the item and other segments may be associated. The label formed from the segments associated with the item may be read.

One embodiment of a system for reading a label may include a plurality of cameras configured to capture image data of a label applied to an item. A non-transitory memory configured to receive the image data captured by the cameras. A processing unit may be in communication with the non-transitory memory, and configured to determine 3D position of each segment of the label imaged by any of the cameras, associate the segments in the same relative 3D location as the item and other segments, and read the label formed from the segments associated with the item.

One embodiment of a method of reading labels disposed on an item may include capturing an image of an item inclusive of a plurality of symbols disposed thereon. The imaged symbols may be partially decoded to form segments associated with the imaged symbols. A determination of a location of the segments relative to the item may be performed. The segments may be organized into groups based on determined location of the respective segments. The grouped segments may be combined to form a set of full labels associated with respective symbols. Quality attributes of each of the full labels may be determined, and a full label associated with each of the symbols having highest quality attributes may be selected.

One embodiment of a system for reading labels disposed on an item may include a plurality of cameras configured to capture image data of the labels applied to the item. A non-transitory memory may be configured to receive the image data captured by the cameras. A processing unit may be in communication with the non-transitory memory, and be configured to receive an image of an item inclusive of a plurality of symbols disposed thereon. The imaged symbols may be partially decoded to form segments associated with the imaged symbols. Location of the label(s) and segments relative to the item may be determined. The label(s) and segments may be organized into groups based on determined location of the respective segments. The grouped label(s) and segments may be combined to form a set of full labels associated with respective symbols. A determination of quality attributes may be made of each of the full labels, and selection of a full label associated with each of the symbols having highest quality attributes may be performed.

BRIEF DESCRIPTION

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1A:
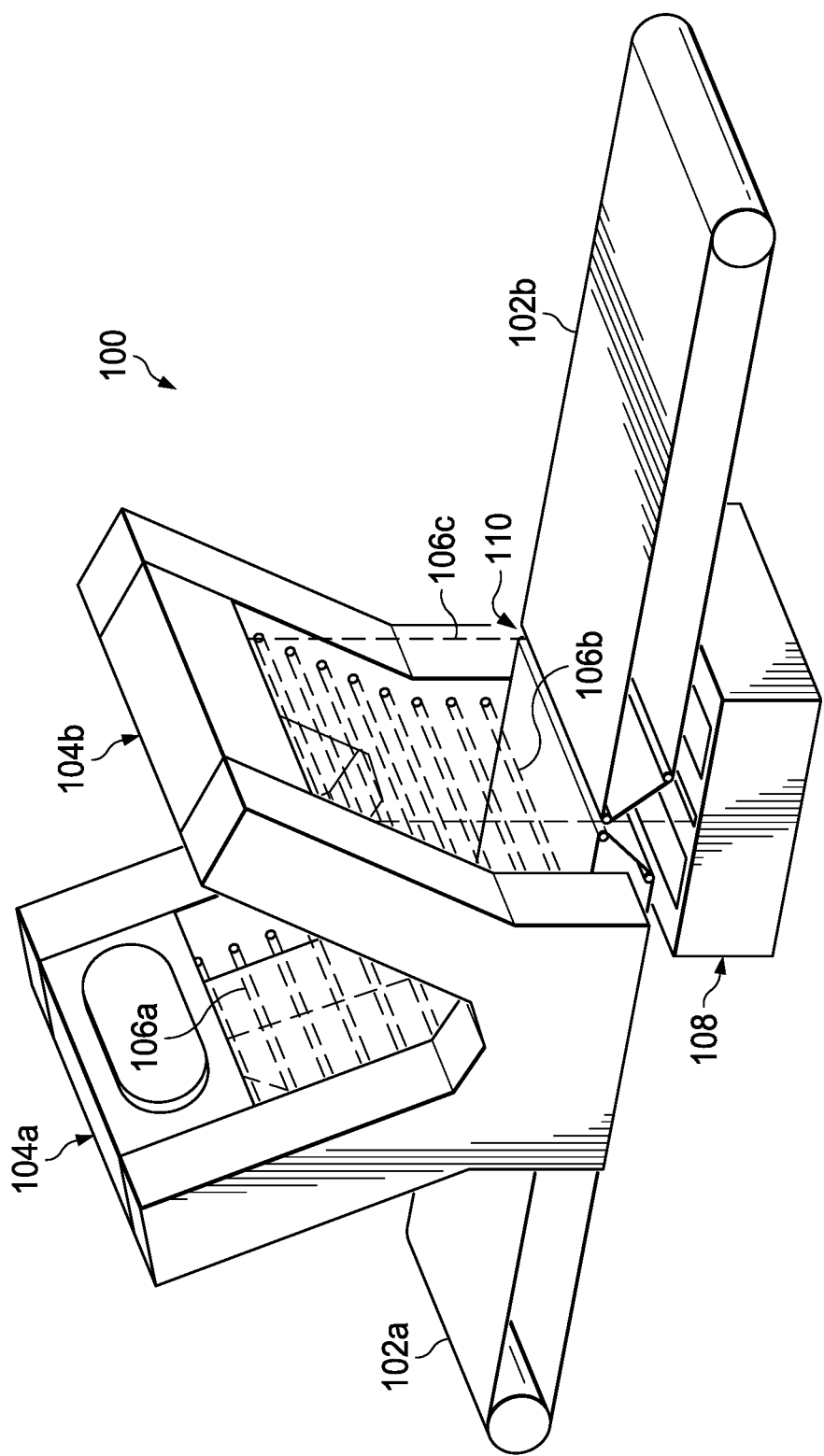
FIGS. 1A-1C are illustrations of an illustrative automated label reader for reading labels of items without human intervention.
Figure 1B:
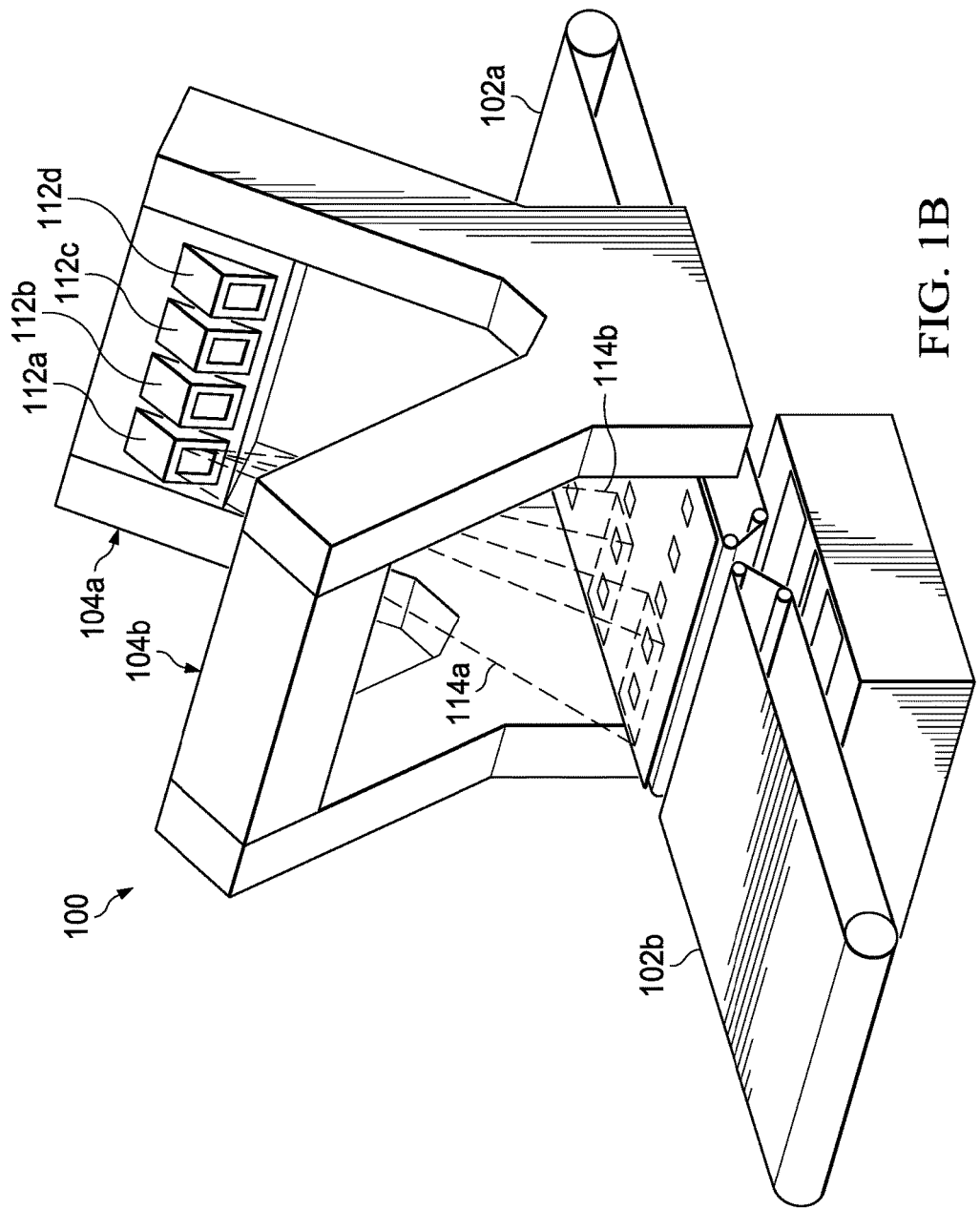
Figure 1C:
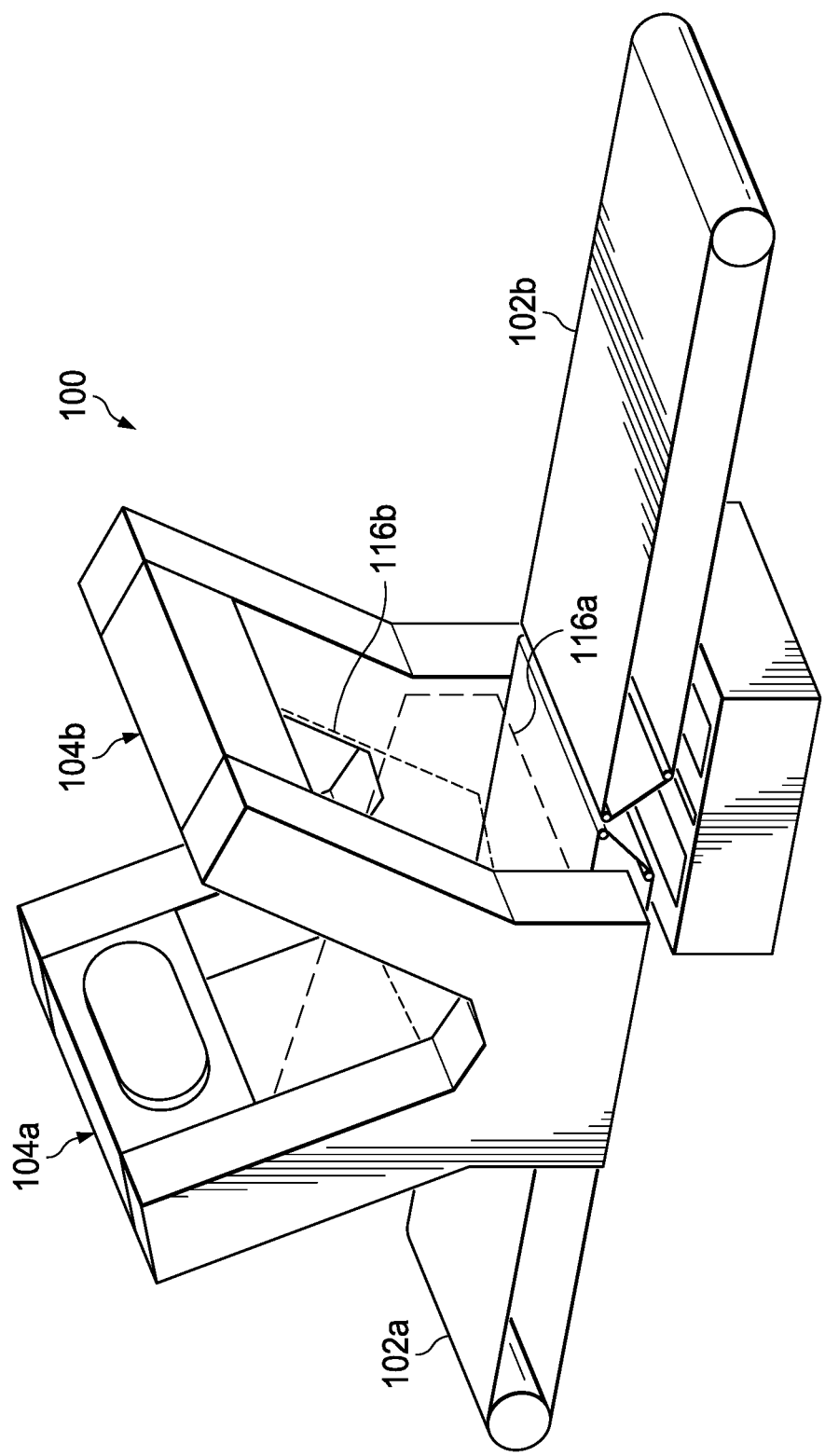

With regard to FIGS. 1A-1C, illustrations of an illustrative automated label reader 100 for reading labels inclusive of barcodes or other machine-readable indicia from items, such as products, without human intervention are shown. The label reader 100 is shown to include conveyor belts 102a and 102b (collectively 102) that may be used for moving items (not shown) through an entry arch 104a and exit arch 104b (collectively arches 104). The arches 104 may include image scanners or cameras (not shown) and sensors (not shown) to measure position and size of the items being scanned. The arches 104 are configured to form a scanning portal through which items on the conveyer belts 102 pass and are automatically scanned without human intervention or interaction (beyond possibly placing the items on the conveyer belts 102). The sensors operate to measure presence, dimensions, orientation, and location of items, and cameras operate to image labels of the items, where the images may be synchronized with data from the sensors and with one another so that 3D physical positions of the labels may be accurately imaged and distinguished from one another, as further described herein. The number of cameras may be 15 or more, and be oriented to capture images at different angles as the items travel through the portal. It should be understood that fewer cameras may be used, as well. The cameras of the label reader 100 may be configured to image top-to-bottom, bottom-to-top, left-to-right, right-to-left, diagonally left-to-right, diagonally right-to-left, front to back, and along the entry and exit of the arches 104. Other directions and angles may be utilized for imaging labels on items.

For such an automated label reader 100, items are generally specified to be placed with a certain separation distance, such as 4 inches, between any two items placed on the conveyer belts 102. However, such a spacing specification is often violated by users who place the items on the entry conveyer belt 102a. As an example, users may place products within an inch or less of other products, and, in other cases, users may stack products on top of one another. In either of these cases, it is possible for one of more cameras to capture one or more segments of labels from each of the products that are in a field-of-view of the respective one of more cameras.

As illustrated with the automated label reader 100, an entry light curtain 106a, exit light curtain 106b, and vertical light curtain 106c (collectively 106) may be used to determine presence, dimensions (e.g., height, width, length), orientation (e.g., rotation from direction of travel on a conveyer belt), and location of an item passing through the arches 104. By capturing the presence, physical dimensions, orientation, and location of the items, simplistic or more detailed computer models of the items may be generated. Moreover, by sensing physical information of items passing through the arches 104, 3D positioning of labels may be utilized to associate the labels and/or segments of labels with the products or items passing through the arches 104, as further described herein.

The light curtains 106 may be configured by using sensors, such as light emitting diode (LED) and photodiode pairs, that may be used to determine physical presence, positioning, dimensions, and orientation of the items. Image scanners or cameras may be used to capture images of labels on the items. Once imaged, determination of the 3D physical locations of the labels may be performed utilizing image processing, as further described herein. The label reader 100 may include a processing unit (not shown), non-transitory memory (not shown), and communications devices (not shown) configured to communicate with sensors and cameras, a configured to execute software to perform the functionality described herein.

As further shown, the label reader 100 may also include bottom camera(s) 108, among other cameras disposed on the arches 104, that may be used to image items as the items pass across a gap 110, optionally covered with a transparent surface, such as glass, between the entry conveyor belt 102a and exit conveyor belt 102b so as to scan labels on the items. The camera(s) 108 may be one dimensional or line scan cameras, as understood in the art. Alternatively, the cameras may be two dimensional cameras. The configuration of the camera(s) 108 may depend on a configuration of the gap 110 and/or conveyor belts 102.

As shown in FIG. 1B, the automated label reader 100 includes four cameras 112a-112d (collectively 112). As shown, camera 112a may be configured to generate one or more imaging paths 114a and 114b (collectively 114) that are longitudinally aligned along the direction of travel of the items being moved along the conveyor belt 102. The imaging paths 114 may be used to capture images of labels disposed on the items as the items pass through the barcode scanner 100. Because alignment of the cameras 112 are known and physical presence, location, dimension, and orientation of the items are known, 3D location of the labels may be determined.

As shown in FIG. 1C, additional image paths 116a and 116b (collectively 116) may be collected from cameras (not shown) positioned on lower sides of the arches 104. These cameras may image the labels as the items are passed along the conveyor belts 102. Again, each of the cameras are calibrated with a particular orientation to collect images, thereby enabling the automated label reader 100 to determine 3D location coordinates of the labels on the items.

The use of multiple cameras of the automated segment of a label reader 100 may provide for label stitching using the 3D coordinates associated with each segment of a label because each item on which a label is to be scanned may be measured by sensors, such as the entry arch light curtain 106a, exit arch light curtain 104b, and vertical light curtain 106c. The sensed physical size, shape, and orientation may be used to generate a simplified rectangular or cylinder 3D model of the item. Concurrently, with known position and orientation of cameras and timestamp of label reading (e.g., system time stamp and item speed) from the cameras, a pinhole camera model may be used to project a label reading vector (see, for example, FIG. 2) from the cameras to the item surface that may be represented by 6 surfaces for a rectangular model and 3 surfaces for a cylinder model.

The reading vector and item surface cross-section may be used to form a "hitting" coordinate (X, Y, Z) in a system global coordinate system. The hitting coordinate (X, Y, Z) may be converted to a relative position to a computed center point (i.e., centroid) of the item. As a result, a measurement may be made that allows for determining concentration of label fragments in space, and grouping the label fragments accordingly. In this way, less strict overlap or stitching requirements can be used, and label reconstruction may be faster and less prone to stitching label fragments that are erroneously attributed to a same item. The application of label location based sorting and partial label stitching provides for the following features:

(a) use the physical hitting 3D coordinate or location information (X, Y, Z) from different views to confirm that the label read is correct to minimize mis-assigning a label to an item; and (b) use the physical hitting 3D location information (X, Y, X) to decide which group of segments are from the same physical label to improve label read rate by loosening "label stitching" overlap criteria and to avoid misread.

The segment consolidation processing time may be reduced by dividing the segments assigned to one item into different groups and stitching within each group. Furthermore, as multiple label fragments are imaged by different cameras, and yet belong to the same label, label fragments may be advantageously combined using the processes described herein. The processes may be expanded to other techniques for including 3D coordinate information to each label fragment, such as TOF cameras, stereo cameras, and the like, and thus fall into the general category of applications of 3D technology for label readers and potentially other systems.

Figure 2:
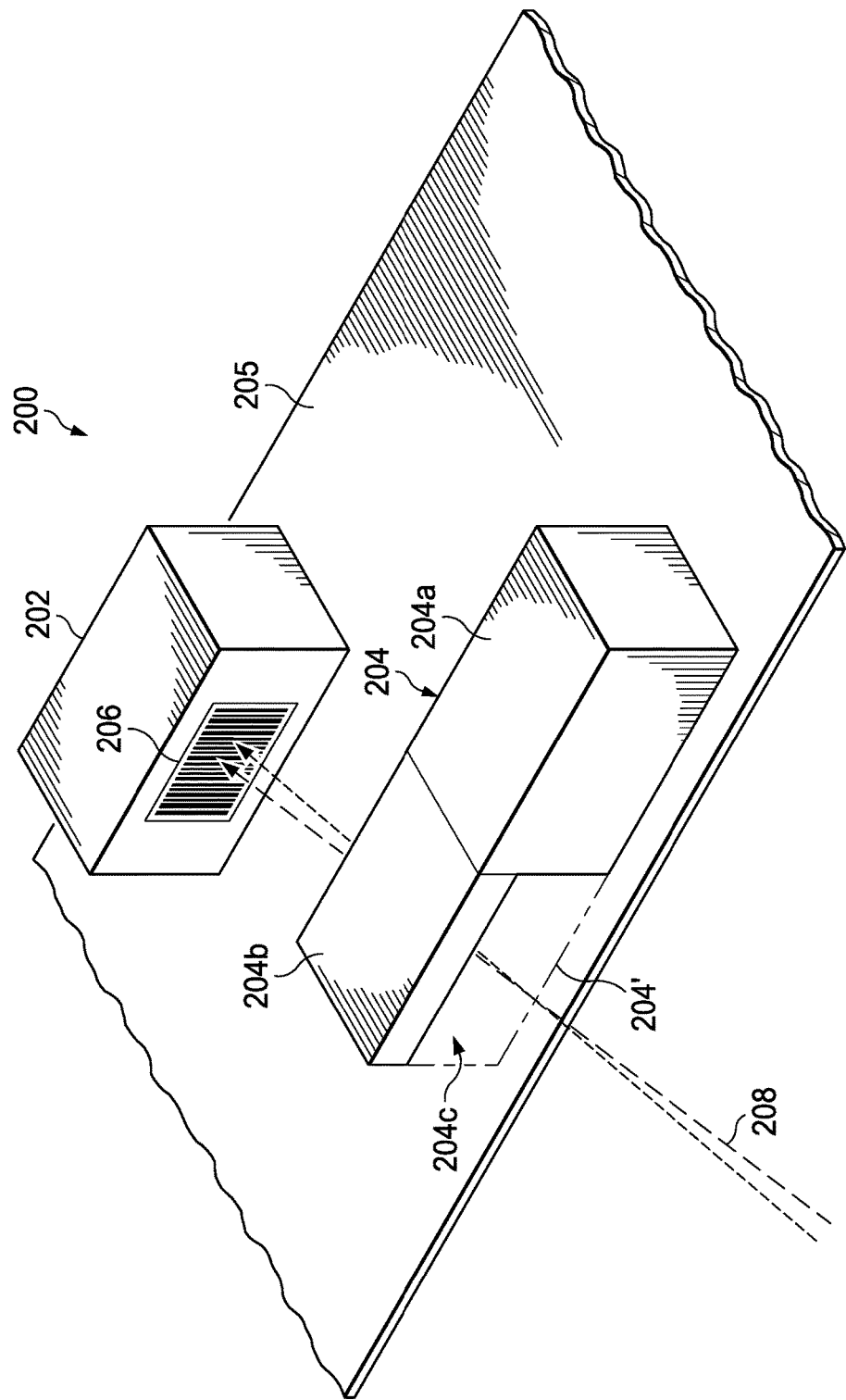
FIG. 2 is an illustration of an illustrative scan in which two items with labels are present, and where camera "see-through" occurs.

With regard to FIG. 2, an illustration of an illustrative scan in which two items 202 and 204 with labels, in this case barcodes, are present, and where camera "see-through" occurs is shown. The item 204 (e.g., brush) includes two portions, including a right-hand portion 204a (e.g., bristles of brush) that is rectangular, and a left-hand portion 204b (e.g., handle of brush) that is rectangular and extends from a top portion of the right-hand portion 204a, but does not extend all the way to a surface 205 on which the items 202 and 204 reside. As a result of the left-hand portion 204b not extending to the surface 205, a gap 204c exists beneath the left-hand portion 204b, such that a barcode 206 (label) positioned on item 202 is visible through the gap 204c, and may be imaged from a camera facing the items 204 and 202 having a field-of-view in line with a camera label read aiming vector 208 beneath the left-hand portion 204b of the item 204. In one embodiment, a simplified computer model 204' of the item 204 may be created, where a simplified computer model may include computer generated rectangles and cylinders, for example, at 3D locations as measured by sensors, such as the light curtains 106 of FIG. 1A. However, in creating a simplified computer model 204', the simplified computer model 204' is inaccurate in that the rectangular computer model 204' of the item 204 would cause the item 204 to appear as if the left-hand portion 204b extends to the surface 205 on which the item 204 rests so as to be a rectangle. Hence, the barcode 206 on item 202 is applied to the item 204, thereby causing a misapplication of price and item description from the barcode 206 that is actually associated with item 202 to the item 204.

As further described herein, by determining a position of the barcode 206 (or segments of the barcode 206) in three dimensions, including X, Y, and Z coordinates, a determination may be made that the barcode 206 is to be associated with item 202, and not item 204. Although the item 202 is shown as a brush, it should be understood that many other configurations and alignments of items with labels (e.g., barcodes) thereon may be possible that result in a camera to capture images of one or more labels on further items that appear to be on a closer item being imaged.

Figures 3A, 3B:
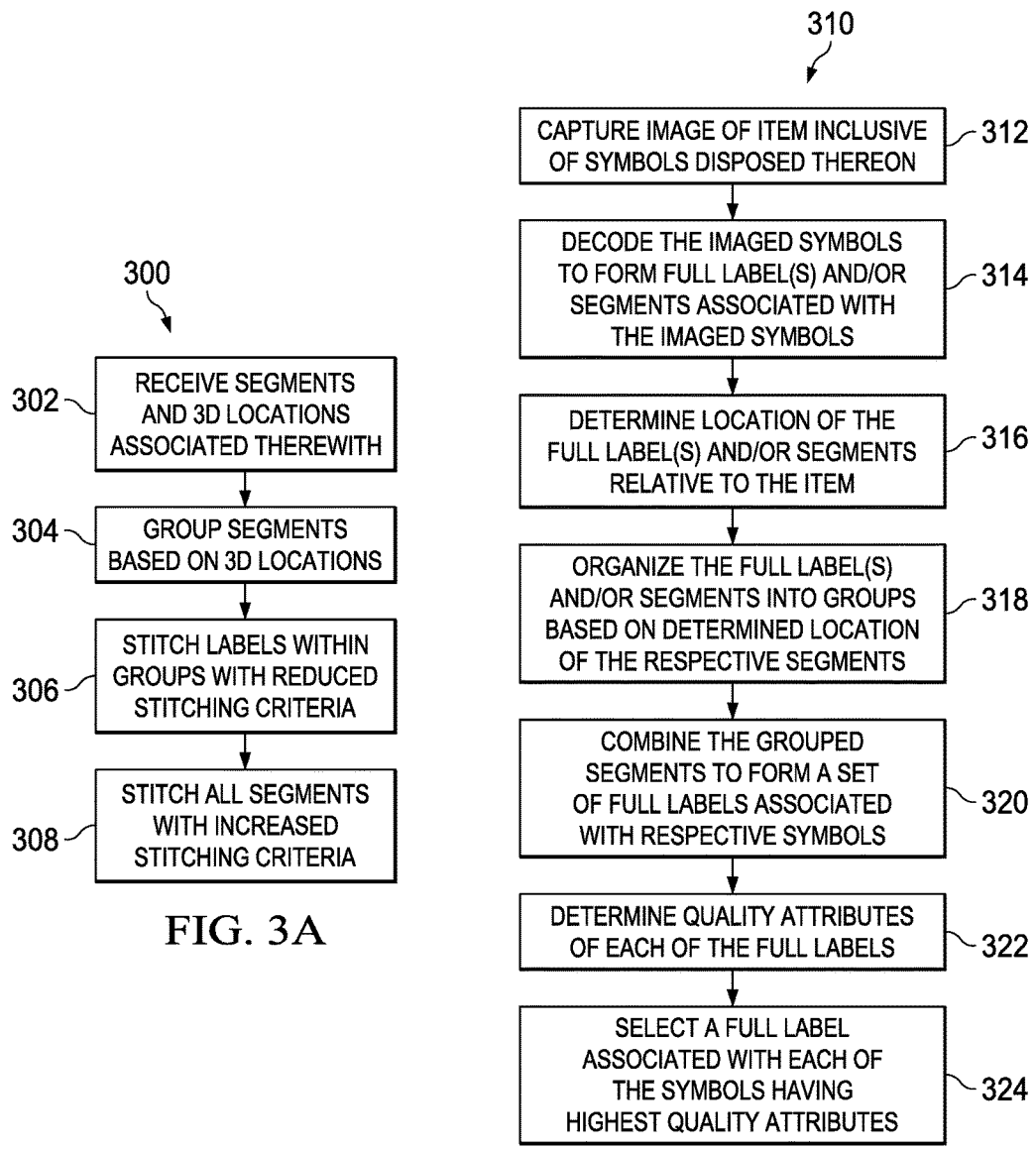
FIG. 3A is a flow diagram of an illustrative process for performing label stitching according to one embodiment.
FIG. 3B is a flow diagram of an alternative illustrative process for improving accuracy of label decoding using location of symbols or segments of a label.

To solve for the problem of a label reader not always seeing a full label, label stitching criteria may be loosened without misread rate being increased by using label location information for confirmation. Label position may be available from multiple cameras. If label segments are known to be read from the same physical label, then label stitching criteria may be loosened so that label read rate increases. FIGS. 3A and 3B provide for two embodiments for solving the problem of a label reader not always seeing a full label.

With regard to FIG. 3A, a flow diagram of an illustrative process 300 for performing label stitching according to one embodiment is shown. The process 300 may start at step 302, where segments of labels and 3D locations associated with the segments are received. The segments may be one or more portions (e.g., alphanumeric characters) of a label that are read by one or more image scanners or camera of a label reader, such as label reader 100 of FIG. 1. The 3D locations may include X, Y, and Z coordinates that may be determined for each camera based on sensing presence, size, shape, and orientation of items along with respective alignment of each camera that images items within a field-of-view of the respective cameras.

As an example, TABLE I shows segments that may be read from one or more cameras of the label reader, and 3D locations may be associated with each of the segments:

TABLE I

| Barcode Segments and Associated 3D Locations | |
|---|---|
| Segment | 3D Location |
| 1 | X1, Y1, Z1 |
| 2 | X2, Y2, Z2 |
| ... | ... |
| N | Xn, Yn, Zn |

At step 304, segments may be grouped based on 3D locations or coordinates. Such grouping may utilize a distance threshold that may be used to compare the 3D locations of the respective segments captured by the cameras. Multiple cameras may be utilized to determine positioning of label segments of items in three dimensions. The grouping of segments may be performed utilizing the following illustrative pseudo-coded process shown in TABLE II.

TABLE II

| Segment Grouping Pseudo Code |
|---|
| Segment grouping based on location THD (distance threshold) |
| pick a segment 1, and perform distance calculation to |
| segment 1 for all other segments |
| segment one -> group 1 |
| for i = 2:n |
|     d = max (\|Xi-X1\|, \|Yi-Y1\|, \|Zi-Z1\|); |
|     if d <= THD |
|         segment i -> Group 1 |
|     else |
|     end |
| end |
| pick one segment k NOT assigned to Group 1, and define the |
| segment as Group 2, and repeat distance calculation: |
| Segment k -> Group 2 |
| for i = 2:m %% (m: number of remaining segments not |
| assigned to Group 1) |
|     d = max(\|Xi-Xk\|, \|Ni-Yk\|, \|Zi-Zk\|); |
|     if d <= THD |
|         segment i -> Group 2 |
|     else |
|     end |
| end |
| Repeat the above process until all segments for item A are |
| allocated to a group number |

At step 306, labels within the groups as determined by the 3D grouping may be stitched together utilizing a reduced stitching criteria. The reduced stitching criteria may be stitching criteria that is reduced from typical label stitching. As an example, typical label stitching requires multiple characters or guard of a label to be matched to reduce errors. In a reduced stitching criteria situation, the number of characters required to be matched may be one character or guard overlap. Alternatively, more than one character or guard overlap may be utilized, but less than a number required using conventional label stitching under similar conditions for a particular process, such as high-speed barcode scanning, as described herein. Additional and/or alternative stitching criteria may be reduced or relaxed in accordance with the process described herein. Other stitching criteria may include number of times a segment has been seen. In some symbologies, guards do not exist, so using those symbologies other non-guard dependent criteria may be used. Character quality and number of times one or more characters have been read may be utilized in performing label stitching.

At step 308, all segments (not in the same group) with increased or more strict stitching criteria may be stitched. As an example, the increased stitching criteria may require two characters to overlap. Step 308 may be utilized for potential error of a label hitting calculation caused by item detection error, item stock on transition plate, etc. Step 308 may be used in the event that the label stitching performed in step 306 is not satisfied.

With regard to FIG. 3B, a flow diagram of an alternative illustrative process 310 for improving accuracy of symbol or label decoding using the location of symbols (e.g., characters represented by barcode segments) on an item is shown. In the case of capturing an image of a full label or barcode, stitching is not needed. However, where full labels are not captured for whatever reason, stitching is used. Images of full labels and segments may be processed together for decoding. Thus, decoding imaged symbols includes decoding all symbols, when all are captured, and partially decoding imaged symbols when symbols are partially captured (i.e., segments are captured). For the process, the following nomenclature may be utilized:

Symbology—a specified structure and set of symbols that are used to represent data.

Symbol—a specific instance of data represented with a symbology.

Full Label—decoded data representing all of the data from an item's symbol (barcode, 2D symbol).

Segment—partially decoded data from a part of a item's symbol (barcode, 2D symbol).

Symbolic Character—data that represents a defined set of features for a symbology. In the case of linear and two dimensional symbologies, a character may represent a structural feature or a data carrying feature.

Barcode—a symbol that follows the specification of a linear symbology.

UPCA—GS1 UPCA linear barcode symbology.

LG—Left Guard; a structural symbolic character on the left end of a UPCA symbol.

CG—Center Guard; a structural symbolic character in the center of a UPCA symbol.

RG—Right Guard; a structural symbolic character on the right end of a UPCA symbol.

L1 to L9—symbolic character on left side of barcode with a data value of 1 to 9.

R1 to R9—symbolic character on right side of barcode with a data value of 1 to 9.

Item—a physical object or set of objects that may have one or more symbols. An item is from the perspective of the scanning device. There may be one or more objects that are combined into one item during a scanning episode.

Loc X, Loc Y, Loc Z—three numbers to define the position of a symbolic character, segment, or symbol in a three dimensional coordinate system using an item's centroid as the origin.

LabelData—numeric version of the data represented by the data of a symbol.

Quality—a measurement of the accuracy, dependability, integrity, or goodness of a full label, segment, or symbol.

Character Quality—a measurement of the accuracy, dependability, integrity, or goodness of a symbolic character.

Number of Reads, Num Reads—the number of times a character, segment, or symbol have been captured by a device during a scanning episode.

RA(1-n)—result set A. Set of full labels and/or segments that are an indexed result set.

RB(1-p, 1-q)—result set B. Set of full labels or segments that are a pre-consolidation result set indexed by group number (1-p) and result within each group(1-q).

RC(1-p, 1-r)—result set C. Set of full label(s) that are a post-consolidation result set indexed by group number(1-p) and result within each group(1-q).

RD(1-p)—result set C. Set of full label(s) that are a set of best quality results indexed by group number(1-p).

Combined RAs—list of RA indexes that have been combined to make a new result.

The process 310 is explained hereinbelow in conjunction with the following example.

Example Barcodes

For this example, the following barcodes are on an item that is scanned.

1. UPCA 123456446212

Barcode Symbolic Characters: LG L1 L2 L3 L4 L5 L6 CG R4 R4 R6 R2 R1 R2 RG

2. UPCA 322156832572

Barcode Symbolic Characters: LG L3 L2 L2 L1 L5 L6 CG R8 R3 R2 R5 R7 R2 RG

The process 310 may start at step 312, where one or more cameras may be configured to image an item with multiple symbols positioned thereon. At step 314, full label(s) and/or segments of barcodes or symbols may be produced when processing images of an item. The label(s) and/or segments may be captured and reported by multiple cameras or same camera and different frames, and used to avoid label and item mis-association, as described herein. In producing the full label(s) and/or segments, an attempt to locate and possibly decode barcodes may be made. For the segments, multiple results RA(1-n) for an item may be determined. As shown in TABLE III, the results from reading the two barcodes have multiple segments each, three segments for the first barcode and two segments for the second barcode. One of the segments associated with the first barcode include erroneous data having been determined.

The results may include one or more of the following: image location references, orientation references, partially decoded labels (e.g., segments), or fully decoded labels (e.g., barcodes). Decoded barcodes may include the use of barcode segment location algorithms, signal processing, segment decoding, full label decoding, stitching, character correlation, element correlation, character reconstruction, guard insertion, and other decoding techniques, as understood in the art.

TABLE III

Segments from two labels on an item

1) From UPCA 123456446212
    LG L1 L2 L3 L4 L5 L6 CG (Segment 1)
        L5 L6 CG R4 R4 R6 R2 R1 R2 RG(Segment 2)
        L5 L6 CG R4 R5 R9 R2 R1 R2 RG(Segment 3, with erroneous data)

TABLE III-continued

Segments from two labels on an item

2) From UPCA 322156832572
    LG L3 L2 L2 L1 L5 L6 CG                    (Segment 4)
           L5 16 CG R8 R3 R2 R5 R7 R2 RG (Segment 5)

At step 316, location information (Loc X, Loc Y, Loc Z) may be associated with the full label(s) and/or segments determined at step 314. For each of the results RA(a), the associated location of the region relative to the item used in locating and or decoding may be stored in a non-transitory memory. In addition, character quality and number of reads (Num Reads) may be determined and associated with each of the segments.

TABLE IV shows an example of the various information being associated with the five segments of the two barcodes from TABLE III. The region may be identified by references to a bounded space, a centroid of an item, or other location references. In being relative to an item, the location information may be relative to a coordinate system of the item. Transformations of location data may be performed to convert two-dimensional location data to three-dimensional item location data. Alternative coordinate system and transformations may be utilized.

Moreover, from the results shown in TABLE V, if the number of reads or quality measurements are used to filter the results, the best result is incorrect in that the result is a combination of two different labels. Quality measurements are helpful to find the best result, but do not help when there are multiple symbols on a single item. As shown in TABLE V, if quality and/or number of reads were used to filter the results RAs, combined RAs 1&5 would be selected. However, selection of that is incorrect since (i) there are two labels, and (ii) that combination incorrectly includes segments from each of the two labels. Hence, utilizing the process shown in FIG. 3B avoids such error(s) in processing the imaged labels.

At step 318, full label(s) and/or segments may be grouped by region of the item from which the segments were captured. In determining the region, the locations Loc X, Loc Y, and Loc Z may be used. It should be understood that while the example uses three dimensions, the principles contemplate a two-dimensional solution, as well. The seg-

TABLE IV

Segments with Associated Information

| Label Data | Segment Symbolic Characters and Character Quality | | | | | | | | | | | | | | | | Num Reads | Loc X | Loc Y | Loc Z | RA | RB |
|---|---|---|---|---|---|---|---|---|---|---|---|---|---|---|---|---|---|---|---|---|---|---|
| 123456446212 | Symb Chars: | LG | L1 | L2 | L3 | L4 | L5 | L6 | CG | | | | | | | | 5 | 38 | 5 | 30 | 1 | 1,1 |
| | Char Quality: | 10 | 10 | 10 | 10 | 10 | 10 | 10 | 10 | | | | | | | | | | | | | |
| | Symb Chars: | | | | | | L5 | L6 | CG | R4 | R4 | R6 | R2 | R1 | R2 | RG | 2 | 39 | −5 | 28 | 2 | 1,2 |
| | Char Quality: | | | | | | 10 | 10 | 10 | 6 | 6 | 6 | 6 | 6 | 6 | 6 | | | | | | |
| | Symb Chars: | | | | | | L5 | L6 | CG | R4 | R5 | R9 | R2 | R1 | R2 | RG | 1 | 40 | −2 | 25 | 3 | 1,3 |
| | Char Quality: | | | | | | 10 | 10 | 10 | 4 | 4 | 4 | 4 | 4 | 4 | 4 | | | | | | |
| 322156832572 | Symb Chars: | LG | L3 | L2 | L2 | L1 | L5 | L6 | CG | | | | | | | | 3 | 41 | 10 | −25 | 4 | 2,1 |
| | Char Quality: | 7 | 7 | 7 | 7 | 7 | 7 | 7 | 7 | | | | | | | | | | | | | |
| | Symb Chars: | | | | | | L5 | L6 | CG | R8 | R3 | R2 | R5 | R7 | R2 | RG | 4 | 42 | 5 | −27 | 5 | 2,2 |
| | Char Quality: | | | | | | 8 | 8 | 8 | 8 | 8 | 8 | 8 | 8 | 8 | 8 | | | | | | |

As understood in the art, if the segments from the item are consolidated using conventional techniques, the full labels shown in TABLE V results. There are six results, which is a problem since there are only two symbols on the item.

ments from each symbol region are grouped into groups 1 and 2. More particularly, the RA(1–n) results may be organized into barcode groups, where each barcode group contains the results from the region on the item of a potential

TABLE V

Potential Full Label Results from Consolidation of the Segments

| Combined RAs | Label Data | Segment Symbolic Characters and Character Quality | | | | | | | | | | | | | | | | Quality | Num Reads |
|---|---|---|---|---|---|---|---|---|---|---|---|---|---|---|---|---|---|---|---|
| 1 & 2 | 123456446212 | Symb Chars: | LG | L1 | L2 | L3 | L4 | L5 | L6 | CG | R4 | R4 | R6 | R2 | R1 | R2 | RG | 6 | 2 |
| | | Char Quality: | 10 | 10 | 10 | 10 | 10 | 10 | 10 | 10 | 6 | 6 | 6 | 6 | 6 | 6 | 6 | | |
| 1 & 3 | 123456459212 | Synth Chars: | LG | L1 | L2 | L3 | L4 | L5 | L6 | CG | R4 | R5 | R9 | R2 | R1 | R2 | RG | 4 | 1 |
| | | Char Quality: | 10 | 10 | 10 | 10 | 10 | 10 | 10 | 10 | 4 | 4 | 4 | 4 | 4 | 4 | 4 | | |
| 1 & 5 | 123456832572 | Symb Chars: | LG | L1 | L2 | L3 | L4 | L5 | L6 | CG | R8 | R3 | R2 | R5 | R7 | R2 | RG | 8 | 4 |
| | | Char Quality: | 10 | 10 | 10 | 10 | 10 | 10 | 10 | 10 | 8 | 8 | 8 | 8 | 8 | 8 | 8 | | |
| 4 & 2 | 322156446212 | Symb Chars: | LG | L3 | L2 | L2 | L1 | L5 | L6 | CG | R4 | R4 | R6 | R2 | R1 | R2 | RG | 6 | 2 |
| | | Char Quality7 | 7 | 7 | 7 | 7 | 7 | 10 | 10 | 10 | 6 | 6 | 6 | 6 | 6 | 6 | 6 | | |
| 4 & 3 | 322156459212 | Symb Chars: | LG | L3 | L2 | L2 | L1 | L5 | L6 | CG | R4 | R5 | R9 | R2 | R1 | R2 | RG | 4 | 1 |
| | | Char Quality: | 7 | 7 | 7 | 7 | 7 | 10 | 10 | 10 | 4 | 4 | 4 | 4 | 4 | 4 | 4 | | |
| 4 & 5 | 322156832572 | Symb Chars: | LG | L3 | L2 | L2 | L1 | L5 | L6 | CG | R8 | R3 | R2 | R5 | R7 | R2 | RG | 7 | 3 |
| | | Char Quality: | 7 | 7 | 7 | 7 | 7 | 8 | 8 | 8 | 8 | 8 | 8 | 8 | 8 | 8 | 8 | | | barcode. Results organized into barcode groups may be referenced as RB(1-p,1-q), where the first index is a reference to the group number in the range of 1-p, and the second index is a reference to a result within the group in the range of 1-q.

As further shown in TABLE IV, results RB show indicate the groups (i.e., 1 or 2) and result within the group (1-3 and 1-2, for each of the respective groups 1 and 2). In organizing the RA(1-n) results into barcode groups, source location of each RA(1-n) may b compared to other RA(1-n) results by searching for overlapping spaces or spaces that are within a fixed or configurable distance from each other. As an example, distance formulas may be utilized to determine relative distances between or among the different results RA(1-n).

As another example, if a minimum quality level is set to 2 and/or Num Reads is set to 1, then all three results remain for additional selection protocols. One protocol is to select the result with the best quality level and another protocol is to select the result with the highest Num Reads from each group. If either protocol is used or some combination of these protocols are used, then results RC(1,1) is assigned RD(1) and RC(2,1) is assigned RD(2). These two results, RD(1) and RD(2), are correct.

Figure 4:
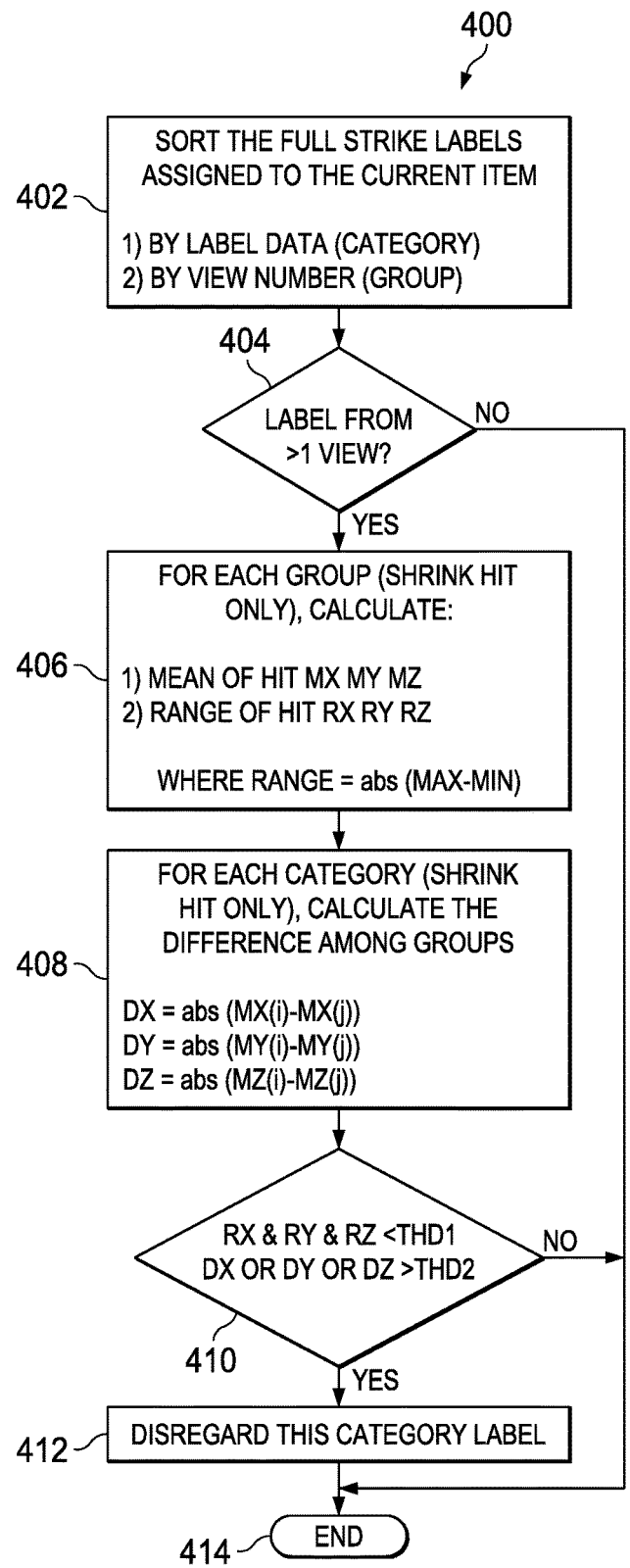
FIG. 4 is a flow diagram of an illustrative process for performing simplified computer modeling and associating labels with the simplified item 3D computer models.

With regard to FIG. 4, a flow diagram of an illustrative process 400 for performing simplified computer modeling and associating 3D labels with the simplified computer models is shown. The process 400 may be performed to solve the problem of camera "see-through," as previously described. The process 400 may start at step 402, where full

TABLE VI

Full Label Results

| Comb RAs | Label Data | Segment Symbolic Characters and Character Quality | | | | | | | | | | | | | | | Qual | Num Reads | RC | RD |
|---|---|---|---|---|---|---|---|---|---|---|---|---|---|---|---|---|---|---|---|---|
| 1 & 2 | 123456446212 | Symb Chars: | LG | L1 | L2 | L3 | L4 | L5 | L6 | CG | R4 | R4 | R6 | R2 | R1 | R2 | RG | 6 | 2 | 1,1 | 1 |
|  |  | Char Qual: | 10 | 10 | 10 | 10 | 10 | 10 | 10 | 10 | 6 | 6 | 6 | 6 | 6 | 6 | 6 |  |  |  |  |
| 1 & 3 | 123456459212 | Symb Chars: | LG | L1 | L2 | L3 | L4 | L5 | L6 | CG | R4 | R5 | R9 | R2 | R1 | R2 | RG | 4 | 1 | 1,2 |  |
|  |  | Char Qual: | 10 | 10 | 10 | 10 | 10 | 10 | 10 | 10 | 4 | 4 | 4 | 4 | 4 | 4 | 4 |  |  |  |  |
| 4 & 5 | 322156832572 | Symb Chars: | LG | L3 | L2 | L2 | L1 | L5 | L6 | CG | R8 | R3 | R2 | R5 | R7 | R2 | RG | 7 | 3 | 2,1 | 2 |
|  |  | Char Qual: | 7 | 7 | 7 | 7 | 7 | 7 | 7 | 7 | 8 | 8 | 8 | 8 | 8 | 8 | 8 |  |  |  |  |

At step 320, the segments may be combined to create full labels within each group. For each barcode group c, the RB(c,1-q) results may be consolidated and possibly further decoded into a minimal set of unique results. The set of unique results may be referenced as RC(1-p,1-r), where the first index is a reference to the group number in the range of 1p, and the second index is a reference to a unique result within the group n the range of 1-r. By stitching full labels together from segments based on location of the segments, label mis-read is avoided, and read rate may be increased by loosening the stitching criteria, as further described herein.

The results of this step are shown in TABLE VI. The RC column in TABLE VI show there are 2 full labels in group 1 formed by combining RAs 1 &2 and 1 &3 and one full label in group 2 formed by combining RAs 4&5.

At step 322, quality and number of reads may be determined for each of the labels, as shown in TABLE VI. That is, for each member of RC(1-p, 1-r), quality attributes of the result may be determined and stored, where quality attributes may include one or more of the following: number of times each character was decoded, number of segments used to construct the barcode, strength of the barcode edges, a determination as to whether a label was decoded in one strike, closeness of actual bar and space widths to a reference for each decoded character, decoding techniques used to decode the label, or other measures of quality).

At step 324, best results RD may be selected based on quality and/or number of reads. For each barcode group d, the result may be selected from RC(d,1-4) with the best quality that also meets a minimum quality. The best quality results may be referenced as RD(1-p), where the index is a reference to a group number in the range of 1-p.

In one embodiment, if a minimum quality level is set to 5 and/or Num Reads is set to 2, then result RC(1,2) is eliminated and results RC(1,1) is assigned RD(1) and RC(2, 1) is assigned RD(2). The two results, RD(1) and RD(2), are correct.

strike labels assigned to a current item may be sorted. The labels may be sorted by (1) label data (category) and (2) view number (group). If, for example, there are two labels, then those labels may be separated into two categories. The number of groups determined from FIG. 3A may be used for sorting by view number.

At step 404, a determination may be made as to whether a label may be viewed in multiple images from one camera using a mirror or from multiple cameras. If so, then the process continues at step 406, where for each group, calculations may be made to (1) determine mean of a position of a barcode in 3D coordinates, and (2) range of the barcode as measured from respective cameras, as further described herein. The process continues at step 408, where for each category, a difference may be calculated among groups. The difference may be determined by the following difference equations for the 3D measurements (i.e., DX=abs(MX(i)-MX(j)); DY=abs(MY(i)-MY(j)); DZ=abs(MZ(i)-MZ(j))). It should be understood that alternative calculations may be utilized to determine differences between or among groups.

At step 410, a determination may be made as to whether the difference is below a first threshold THD1 or above a second threshold THD2, where THD1 is a threshold used to ensure that the same label data is not overpacked at more than one location, THD2 is a threshold used to ensure that only one physical label in a category is made, and if the difference from different views of a label is over a predetermined threshold distance, a determination may be made that the label belongs to a different item. If so, then a determination is made that the segment does not belong to the item, and the category label may be discarded at step 412. Otherwise, the process ends at step 414. If, at step 404, a determination is made that the label cannot be viewed by more than one group, then the process ends at step 414.

Figure 5:
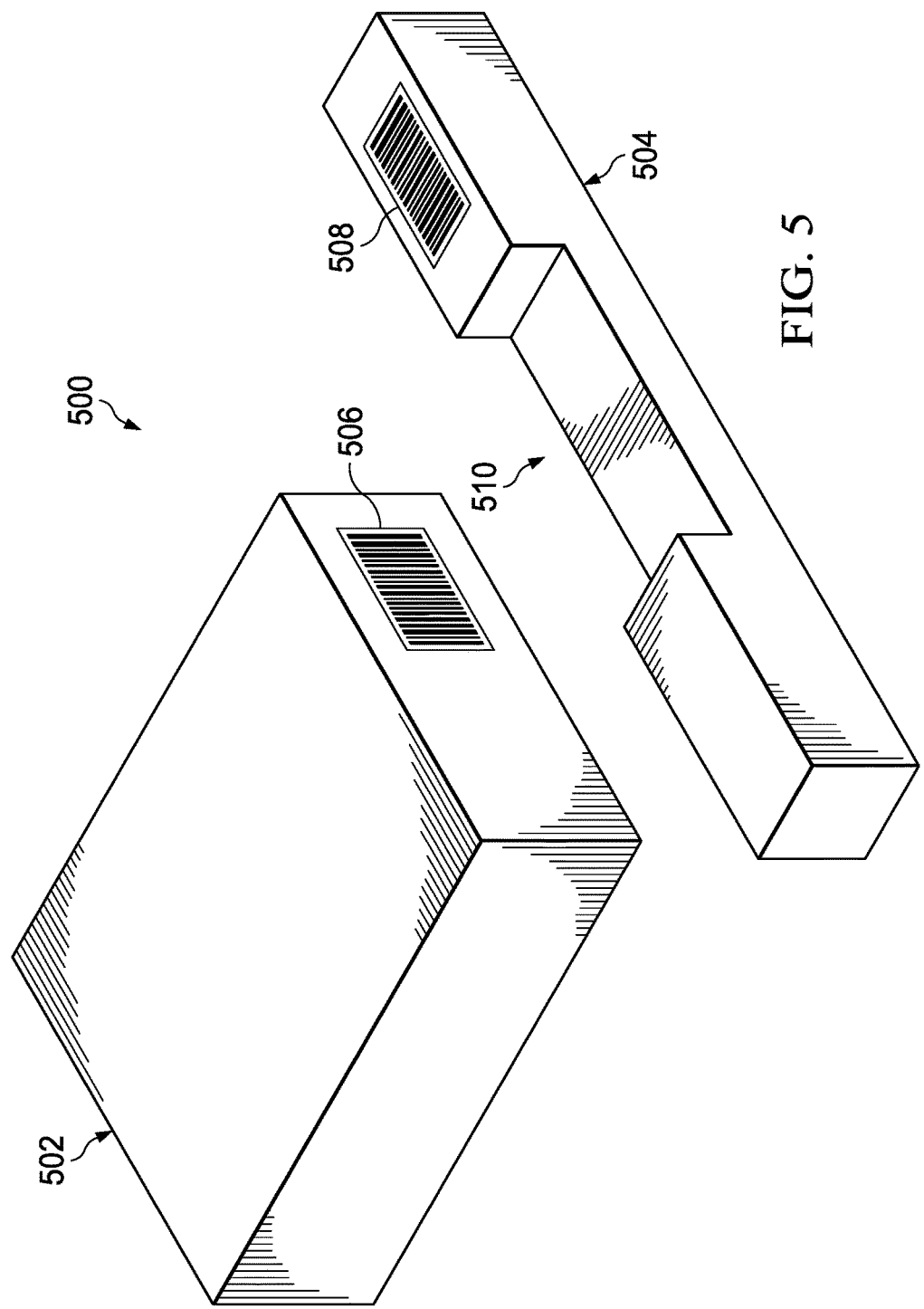
FIG. 5 is an illustration of an illustrative scene inclusive of items that, when scanned with this physical relationship, results in one or more segments of a label on a second item behind a first item being undesirably applied to the first item.

With regard to FIG. 5, an illustration of an illustrative scene 500 inclusive of two items 502 and 504 that, when scanned with this physical relationship, results in a label on item 502 behind item 504 being undesirably read is shown. In this particular case, item 502 is a boxed good with a label 506 being positioned on a bottom of the item, and item 504 may a comb or brush having a label 508 positioned facing upward. The item 504 may also include a center portion 510 threshold distance(s) may be determined so that the segments may be grouped and stitched.

TABLE VII

Full Label Strike List

| S/N | Frame# | Adj_TS | Adj_XC | Adj_YC | LabelData | Catagory | View | SX |
|---|---|---|---|---|---|---|---|---|
| 209 | 66373 | 3.4585 | 1158 | 693 | 4013300034749 | 1 | 49 | −20 |
| 203 | 66372 | 3.3919 | 1200 | 155 | 4013300034749 | 1 | 51 | −21 |
| 205 | 66373 | 3.4252 | 1201 | 214 | 4013300034749 | 1 | 51 | −21 |
| 207 | 66374 | 3.4585 | 1202 | 279 | 4013300034749 | 1 | 51 | −21 |
| 210 | 66375 | 3.4919 | 1204 | 345 | 4013300034749 | 1 | 51 | −21 |
| 185 | 66365 | 3.1919 | 1247 | 142 | 7331210244728 | 2 | 64 | −12 |
| 189 | 66366 | 3.2252 | 1244 | 225 | 7331210244728 | 2 | 64 | −12 |
| 191 | 66367 | 3.2585 | 1241 | 308 | 7331210244728 | 2 | 64 | −11 |
| 190 | 66365 | 3.2252 | 396 | 181 | 7331210244728 | 2 | 66 | −11 |
| 192 | 66366 | 3.2585 | 398 | 269 | 7331210244728 | 2 | 66 | −11 |

| S/N | SY | SZ | SD | ID | MX | MY | MZ | RX | RY | RZ | DX | DY | DZ |
|---|---|---|---|---|---|---|---|---|---|---|---|---|---|
| 209 | −34 | 14 | 610 | 23 | −20 | −34 | 14 | 0 | 0 | 0 | 1 | 88 | 6 |
| 203 | 56 | 8 | 620 | 23 | | | | | | | | | |
| 205 | 54 | 8 | 616 | 23 | | | | | | | | | |
| 207 | 53 | 8 | 613 | 23 | | | | | | | | | |
| 210 | 51 | 8 | 609 | 23 | −21 | 54 | 8 | 0 | 5 | 0 | | | |
| 185 | 82 | 19 | 754 | 23 | | | | | | | | | |
| 189 | 82 | 19 | 759 | 23 | | | | | | | | | |
| 191 | 82 | 19 | 763 | 23 | −12 | 82 | 19 | 1 | 0 | 0 | 1 | 6 | 0 |
| 190 | 76 | 19 | 754 | 23 | | | | | | | | | |
| 192 | 77 | 19 | 759 | 23 | −11 | 77 | 19 | 0 | 1 | 0 | | | |

THD1 = 20
THD2 = 15 that is low enough that the item 502 may be simultaneously viewed from one or more cameras imaging the item 504. As an example, camera (not shown) that images the item 504 at an angle (e.g., 45°) may capture the label 506 of item 502 as a result of the label 506 being in the field-of-view when imaging the item 504. However, according to the principles described herein, because the label 506 may be in line with the item 504 from one or more cameras, 3D position determination of segments of labels, as described with regard to FIG. 4, may be used to ensure that the segments of label 506 captured by the cameras are properly applied to item 502, as opposed to item 504.

As a specific example, label 506 on item 502 has a value of 4013300034749 ('749), and label 508 on the comb 504 has a value of 7331210244728 ('728). In this configuration, a side camera can "see through" the center portion 510 of item 504 to read the label 506 on the item 502, and, utilizing the principles described herein, the label 506 may be properly applied to item 502, and not item 504.

Figure 6:
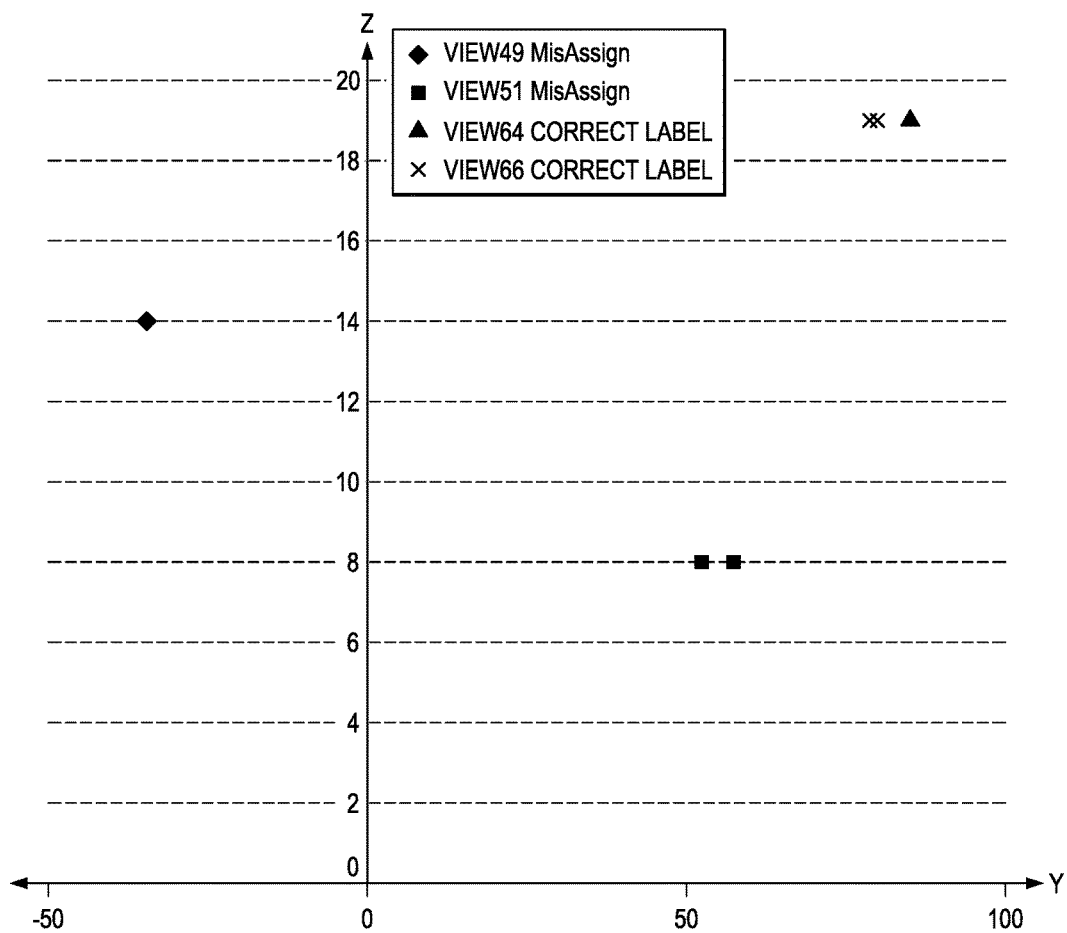
FIG. 6 is a plot of an illustrative graph showing physical positions of a label segment from different camera views or from a same camera view in different frames.

As shown in TABLE VII, a list of full strike read, after processing according to the process of FIG. 4, is provided such that the label 506 is removed from the item 504 using threshold criteria, DY>THD2 & RX & RY & RZ<THD1. In one embodiment, as is shown in the TABLE VII, distance threshold value THD1 may be set to 20, and distance threshold value THD2 may be set to 15. As shown, there are different segment numbers (SN), different image frame numbers, two different labels (i.e., labels '749 and '728), two categories, multiple views, hitting positions (SX, SY, SZ), hitting distances (SD), mean positions (MX, MY, MZ), ranges (RX, RY, RZ), and differences (DX, DY, DZ). As shown, for View49, a difference of DY being 88 is greater than distance threshold level THD2=15, so a determination is made that the segment belongs to a different item, in this case, not item 504 (the comb). By using threshold distances, segments that are in the same relative 3D location as the item and other segments may be determined. That is, by establishing threshold distance(s), items and segments within the With regard to FIG. 6, a plot of an illustrative 2D graph 602 showing positions of a label segment from different camera views or from a same camera view in different frames from TABLE VII is shown. The 2D graph 602 includes Z and Y axes. It should be understood that a 3D graph may alternatively be utilized to show the 3D locations of labels that are imaged. As is shown, two misassignments are determined (i.e., View49 and View51), and two correct labels are determined (i.e., View64 and View66).

Figure 7:
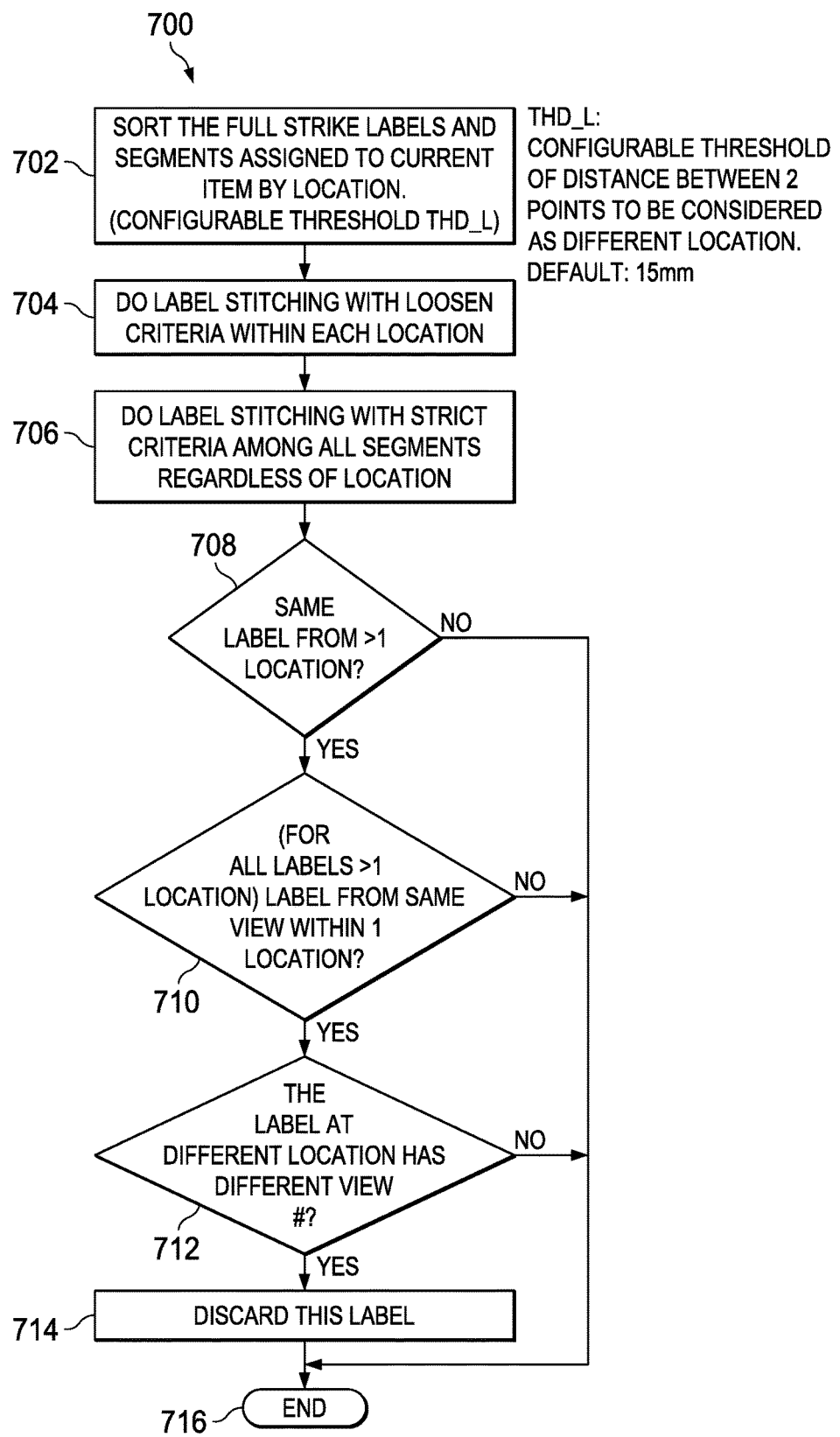
FIG. 7 is a flow diagram of an alternative illustrative process for performing label stitching.

With regard to FIG. 7, a flow diagram of an alternative illustrative process 700 for performing label stitching is shown. The process 700 starts at step 702, where full strike labels and segments assigned to current items may be sorted by location. In one embodiment, a configurable threshold THD_L may be established by setting a distance between two points that are to be considered as different locations. In one embodiment, a default threshold value THD_L may be 15 mm. At step 704, label stitching with loosened criteria within each location may be performed. As previously described, loosened criteria may mean that rather than having to match two or more segments of the label, one segment or guard of a label may be matched since 3D positioning of label segments are used for associating segments of the same label, thereby reducing risk of stitching segments that are not from the same label. The loosened criteria for label stitching may enable faster processing of labels, as well.

At step 706, label stitching with strict criteria among all segments regardless of location may be performed. As previously described, strict criteria for label stitching may mean that multiple segments of a label are to be matched prior to stitching. It should be understood that alternative criteria may be utilized for both loosened criteria and strict criteria.

As step 708, a determination may be made whether a same label from more than one location is identified. If so, then at step 710, a determination may be made for all labels identified with greater than one location from the same view within one location. If so, then a determination may be made at step 712 whether the label at a different location has a different view number. If so, then the label may be discarded at step 714. The process may end at step 716. If any of steps 708-712 are determined to be no, then the process may directly end at step 716 from any of those steps.

EXAMPLES

The below are examples of label stitching:

DEFINITIONS

LG—Left Guard; CG—Center Guard; RG—Right Guard
L1 to L9—Character value 1 to 9 on left side of barcode
R1 to R9—Character value 1 to 9 on right side of barcode

EXAMPLE BARCODES

UPCA 123456789012
Barcode Symbolic Characters: LG L1 L2 L3 L4 L5 L6 CG R7 R8 R9 R0 R1 R2 RG
UPCA 322446787742
Barcode Symbolic Characters: LG L3 L2 L2 L4 L4 L6 CG R7 R8 R7 R7 R4 R2 RG
UPCA 322545765542
Barcode Symbolic Characters: LG L3 L2 L2 L5 L4 L5 CG R7 R6 R5 R5 R4 R2 RG

EXAMPLE SEGMENTS

From UPCA 123456789012
LG L1 L2 L3 L4 L5 L6 CG
CG R7 R8 R9 R0 R1 R2 RG
L6 CG R7 R8 R9 R0 R1 R2 RG
L5 L6 CG R7 R8 R9 R0 R1 R2 RG
From UPCA 322446787742
LG L3 L2 L2 L4 L4 L6 CG
CG R7 R8 R7 R7 R4 R2 RG
L6 CG R7 R8 R7 R7 R4 R2 RG
L4 L6 CG R7 R8 R7 R7 R4 R2 RG
From UPCA 322545765542
LG L3 L2 L2 L5 L4 L5 CG
CG R7 R6 R5 R5 R4 R2 RG
L5 CG R7 R6 R5 R5 R4 R2 RG
L4 L5 CG R7 R6 R5 R5 R4 R2 RG Stitching results using all example segments when requiring a minimum overlap of two characters that are non-guard characters. Overlapping two characters represents one form of strict stitching criteria.

Example of Valid Label Stitching
LG L1 L2 L3 L4 L5 L6 CG R7 R8 R9 R0 R1 R2 RG (Segments from 1)
LG L3 L2 L2 L4 L4 L6 CG R7 R8 R7 R7 R4 R2 RG (Segments from 2)
LG L3 L2 L2 L5 L4 L5 CG R7 R6 R5 R5 R4 R2 RG (Segments from 3)
Example of Invalid Label Stitching
None Stitching results using all example segments when requiring a minimum overlap of 1 character that is a non-guard character. This represents one form of medium stitching criteria.

Example of Valid Label Stitching
LG L1 L2 L3 L4 L5 L6 CG R7 R8 R9 R0 R1 R2 RG (Segments from 1)
LG L3 L2 L2 L4 L4 L6 CG R7 R8 R7 R7 R4 R2 RG (Segments from 2)
LG L3 L2 L2 L5 L4 L5 CG R7 R6 R5 R5 R4 R2 RG (Segments from 3)
Example of Invalid Label Stitching
LG L1 L2 L3 L4 L5 L6 CG R7 R8 R7 R7 R4 R2 RG (Segments from 1 and 2)
LG L3 L2 L2 L4 L4 L6 CG R7 R8 R9 R0 R1 R2 RG (Segments from 2 and 1)

Stitching results using all example segments when requiring a minimum overlap of a center guard. This represents one form of loosened stitching criteria.

Example of Valid Label Stitching
LG L1 L2 L3 L4 L5 L6 CG R7 R8 R9 R0 R1 R2 RG (Segments from 1)
LG L3 L2 L2 L4 L4 L6 CG R7 R8 R7 R7 R4 R2 RG (Segments from 2)
LG L3 L2 L2 L5 L4 L5 CG R7 R6 R5 R5 R4 R2 RG (Segments from 3)
Example of Invalid Label Stitching
LG L1 L2 L3 L4 L5 L6 CG R7 R8 R7 R7 R4 R2 RG (Segments from 1 and 2)
LG L3 L2 L2 L4 L4 L6 CG R7 R8 R9 R0 R1 R2 RG (Segments from 2 and 1)
LG L1 L2 L3 L4 L5 L6 CG R7 R6 R5 R5 R4 R2 RG (Segments from 1 and 3)
LG L3 L2 L2 L5 L4 L5 CG R7 R8 R9 R0 R1 R2 RG (Segments from 3 and 1)
LG L3 L2 L2 L4 L4 L6 CG R7 R6 R5 R5 R4 R2 RG (Segments from 2 and 3)
LG L3 L2 L2 L5 L4 L5 CG R7 R8 R7 R7 R4 R2 RG (Segments from 3 and 2)

With location based stitching, none of the invalid results are generated because segments from different labels are determined to have 3D coordinates that have a minimum distance difference along at least one coordinate axis.

The previous description is of a preferred embodiment for implementing the invention, and the scope of the invention should not necessarily be limited by this description. The scope of the present invention is instead defined by the following claims.

What is claimed:

1. A method for reading a label applied to an item, said method comprising:
    imaging, by a plurality of cameras, the label applied to the item;
    determining 3D position of each segment of the label imaged by any of the cameras;
    associating the segments in the same relative 3D location as the item and other segments;
    reading the label formed from the segments associated with the item;
    stitching a plurality of the associated segments together to form a full label using a loosened stitching criteria as compared to stitching performed when reading labels without associating segments that are in the same relative 3D location as other segments, and the stitching further including stitching all segments captured by the cameras irrespective of 3D positions of the segments; and
    increasing the stitching criteria prior to stitching all segments, wherein increasing the stitching criteria further includes requiring at least two characters or a character and a guard to overlap.

2. The method according to claim 1, wherein determining 3D position includes grouping the segments based on a predetermined maximum distance between any of X, Y, and Z coordinates for each of the segments captured by the cameras.

3. The method according to claim 1, further comprising:
sensing physical dimensions of the item;
generating a 3D computer model of the item based on the physical dimensions of the item; and
associating the segments with the 3D computer model of the item.

4. The method according to claim 1, further comprising determining that at least a portion of the segments are associated with a second item based on segments being positioned in the same relative 3D position as the second item.

5. The method according to claim 1, further comprising:
stitching the segments determined to be associated with the second item; and
reading the segments associated with the second item.

6. The method according to claim 1, wherein
reading a label applied to the item includes reading multiple labels applied to the item;
determining 3D position of each segment of the label includes determining 3D position of each segment of each of the labels imaged by any of the cameras;
associating the segments in the same relative 3D location as the item and other segments associate with the respective labels; and
reading the respective labels formed from the segments associated with the item and respective labels.

* * * * *